(12) United States Patent
Haupt

(10) Patent No.: US 11,122,887 B1
(45) Date of Patent: Sep. 21, 2021

(54) VERTICALLY ADJUSTABLE SUPPORT WITH PNEUMATIC FOOT ASSEMBLIES

(71) Applicant: William J. Haupt, Colton, WA (US)

(72) Inventor: William J. Haupt, Colton, WA (US)

(*) Notice: Subject to any disclaimer, the term of this patent is extended or adjusted under 35 U.S.C. 154(b) by 0 days.

(21) Appl. No.: 16/416,938

(22) Filed: May 20, 2019

Related U.S. Application Data

(60) Provisional application No. 62/716,401, filed on Aug. 9, 2018.

(51) Int. Cl.
   *A47B 9/10*   (2006.01)

(52) U.S. Cl.
   CPC .......... *A47B 9/10* (2013.01); *A47B 2200/004* (2013.01)

(58) Field of Classification Search
   CPC .......................... A47B 9/10; A47B 2200/004
   See application file for complete search history.

(56) References Cited

U.S. PATENT DOCUMENTS

| | | | | |
|---|---|---|---|---|
| 1,007,022 A * | 10/1911 | Doll | ....................... | A47C 7/006 16/32 |
| 1,016,324 A * | 2/1912 | Dunn | ....................... | B60B 33/06 16/32 |
| 2,671,242 A | 3/1954 | Lewis | | |
| 2,788,219 A * | 4/1957 | McClellan | ............. | B60B 33/06 280/43.15 |
| 2,908,031 A * | 10/1959 | Millett | .................... | A47C 7/006 16/34 |
| 3,948,538 A * | 4/1976 | Hovila | .................. | B60B 33/045 280/43.23 |
| 4,067,266 A * | 1/1978 | Lafargue | .................. | A47B 3/00 108/172 |
| 4,828,208 A | 5/1989 | Peterson et al. | | |
| 5,944,291 A * | 8/1999 | Kato | ...................... | A47B 13/00 16/19 |
| 6,120,185 A * | 9/2000 | Masciarelli, Jr. | ...... | B65G 13/12 193/35 MD |
| 6,516,934 B2 * | 2/2003 | Masciarelli, Jr. | ...... | B65G 13/12 193/35 MD |
| 6,550,101 B2 | 4/2003 | Plate | | |
| 6,886,216 B2 | 5/2005 | Graham et al. | | |
| 7,174,982 B2 * | 2/2007 | Kraus | .................... | F16M 11/42 180/117 |
| 7,228,594 B2 | 6/2007 | Smith | | |
| 7,426,974 B1 | 9/2008 | Yeghiayan et al. | | |
| 8,403,344 B2 * | 3/2013 | Carver | ..................... | B60T 1/14 280/30 |
| 8,943,648 B2 * | 2/2015 | Fanourgiakis | ......... | F16M 11/24 16/24 |
| 9,144,300 B2 * | 9/2015 | Cotey | .................. | A47B 3/0815 |

* cited by examiner

*Primary Examiner* — Hanh V Tran
(74) *Attorney, Agent, or Firm* — Suzanne Kikel

(57) ABSTRACT

A vertically adjustable support or table with legs each having a pneumatic foot assembly operated to engage roller ball assemblies on the floor surface thereby allowing the table to be rolled. Each pneumatic foot assembly has a piston unit which is operated by pressurized air from a source, which is controlled by a valve on the table, and which is fluidically connected to a piston chamber of the pneumatic foot assembly. Once the table has been rolled across the floor and is in a desired location, the control valve is operated to release the air from the piston chamber and to rest a circular rim of the pneumatic foot assembly, and therefore, the legs of the table firmly against the floor surface for a stationary or fixed positioning of the table.

12 Claims, 9 Drawing Sheets

VERTICALLY ADJUSTABLE SUPPORT WITH PNEUMATIC FOOT ASSEMBLIES

CROSS REFERENCE TO RELATED APPLICATIONS

This application claims priority to U.S. Provisional Patent Application Ser. No. 62/716,401 filed Aug. 9, 2018, entitled "The Foot", the disclosure of which is incorporated herein by reference in its entirety.

BACKGROUND OF THE INVENTION

1. Field of the Invention

The present invention relates to the general art of supports, and to the field of a vertically adjustable support. More particularly, the invention relates to a vertically adjustable support, such as a table, for example, a work table, which is raised pneumatically and then made moveable via roller ball assemblies which project from a housing at the bottom of the support legs.

2. Brief Description of the Prior Art

Workstations, such as, for example, workbenches, base cabinets with countertops, and equipment such as large power tools are used to support materials and projects while operations are performed on them. To do this job well, workstations are typically built with strength and rigidity, and either weighted or attached to a wall or floor surface so that they may adequately withstand the loads applied to them or the toppling forces generated within them. For example, a board may be clamped to a workbench and cut with a saw. During this operation it is desirable for the workbench to hold the board with little or no motion being projected onto the board.

It is often necessary to move a workstation. The reasons include: sharing the use of the floor surface space occupied by the workstation for other purposes; the need to re-arrange a work area or flexible manufacturing cell; and the need to move projects and tools around a work area or production floor surface while the projects and/or tools are on the workstation itself.

The need for stability and portability of a work bench are at odds with each other. The user of a workbench, for example, is faced with the decision to either choose a bench which is heavy or attached, and therefore, serves well as a work platform; or to choose a bench that is lightweight and free standing to provide movability of the workbench.

In order to make it possible to move a heavy workstation, wheels with casters may be added to the base of the workstation. To prevent undesired motion such as swivel and/or wheel rotation, the casters are oftentimes equipped with a locking mechanism. Alternatively, the casters may be mounted on a mechanism which allows the casters to be raised and/or lowered, as required.

Present-day commercially available air bearings are sometimes used to move heavy equipment. However, such air bearings may be complicated and expensive.

Arrangements for raising and/or lowering a workstation are rare since such arrangements are typically expensive and/or awkward.

Also, there are several disadvantages for using wheels for moving a heavy workstation. Some disadvantages include the following: a) The wheeled bases do not permit a work surface to be solid and stable. Even casters that lock both swivel and wheel rotation almost never allow a workbench, cabinet, or machine tool to sit solid. A work surface that jiggles even slightly is frustrating, unprofessional, and potentially unsafe to work on. b) Wheels do not roll easily across the typical workshop or production floor surface. Caster wheels bearing heavy loads are difficult to push across a shop floor surface. Rolling resistance for a fully loaded cabinet is often so great that physically strong people are needed to move the loaded cabinets and even minor floor surface irregularities can become obstacles. c) Wheels and casters make it difficult to precisely position or steer heavy objects. The casters must swing before tracking predictably, and small motions or alignments tend to be difficult. When a wheeled bench or cabinet is moved against a wall, adjacent bench top, or other object, it often rolls back slightly from hysteresis, and leaves an undesirable gap. d) Wheels and associated hardware create a space under which debris may collect. e) Wheels significantly raise the height of the object. f) Wheels and associated hardware can create a trip hazard. If the wheels are moved further inboard under the object to eliminate or reduce protrusion, the footprint is reduced and stability is sacrificed, creating a tipping or rollover hazard. g) Rolling wheels may create pinch hazards for human toes. h) Wheels generally concentrate supported loads over a small area. The resulting high contact pressure may damage the floor surface or objects over which the wheels are rolled.

As is well-known in the art, several types of tables which are used in commercial and industrial establishments are mounted on casters so that the tables may be moved away from the wall for purposes, such as cleaning under the tables, or the tables need to be moved from one place to the other. In the simplest case, the casters are constructed with a mounting stem secured to the table leg, a yoke dependent from the stem, and a wheel rotatably mounted in the yoke. In more sophisticated instances, the casters may be comprised of an assembly which may be adjustable in height so that the table legs may be adjusted in height in order to raise and/or lower the table or to level the table surface relative to the ground or the floor surface.

In some instances, the table legs are provided with a caster that has a height adjustment assembly threaded into the leg base so that upon rotation of the adjustment assembly, the overall length of the leg may be shortened or lengthened, thereby lowering, raising, or leveling the table surface. However, from time to time, the adjustment assembly may become loosened such that the leg height changes, thereby changing the height of the table surface or rendering the table surface uneven and not level. Accordingly, provisions had been made to lock the height adjustment assembly in an adjusted position in order to maintain the adjustment positioning.

For example, in order to lock in a height adjustment assembly in the caster, set screws have been provided. These set screws are threaded radially into the leg for tightening against the height adjustment assembly. However, this may not be aesthetically attractive. Furthermore, in commercial establishments, such as restaurant kitchens, such as fast-food restaurants, dirt and vermin may collect in the threaded depressions of the leg and in the exposed threads and slots of the set screws. Here again, tools may be required to adjust the height adjustment assembly from time to time.

In some instances, standard tubular legs do not have bores for receiving the set screws. Accordingly, specially modified legs have been required in order to provide threaded bores fore receiving the set screws. In some instances, tables are constructed so that the height of the tables can be adjusted to accommodate disabled people or people with different heights who are using these tables. To this end, provisions have been made to accommodate table height adjustments of up to approximately three inches.

As with any type of threaded caster height adjustment assembly, there is a risk that the assembly may become inadvertently unthreaded from the leg, thereby causing the caster to fall from the table leg. This situation may cause the table to tilt resulting in the items supported on the table to slide from the table causing the items to become damaged and/or causing injury to those people near the table.

There is, therefore, a need in the art to provide a means of moving heavy loads easily while still allowing the loads to be steady and stable when in a parked position.

There is still a further need in the art to provide a versatile base that may be easily moved yet is steady and stable when parked.

There is still a further need in the art to provide a versatile base or support that is easily rolled across the floor surface and which is locked in position on the floor surface.

SUMMARY OF THE INVENTION

The present invention provides such needs. More particularly, the present invention relates to a vertically adjustable support comprising a horizontal top and a plurality of legs supporting the vertically adjustable support on a support surface. Each leg has a pneumatic foot assembly interposed between the leg and the support surface, such as, for example, the floor.

Each pneumatic foot assembly includes a piston unit having a first chamber and a second chamber, the piston unit comprising a piston plate in the first chamber, a piston leg in the second chamber, and a piston connected to the piston leg and located in the second chamber of the piston unit. Several roller ball assemblies are mounted on the piston plate.

A fluid circuit comprises a fluid tank, fluid lines fluidically connecting the fluid tank to the second chamber of each pneumatic foot assembly, and a control valve in the fluid lines to be fluidically interposed in series between the fluid tank and the second chamber of each pneumatic foot assembly.

The piston plate of each pneumatic foot assembly is movable between a support moving position locating the roller ball assemblies mounted thereon into rolling contact with the support surface for movement of the vertically adjustable support in a predetermined location and a support stabilizing position with the roller ball assemblies spaced away from the support surface and with the first chamber of each pneumatic foot assembly contacting the support surface to stationarily position the vertically adjustable support in this predetermined location on the support surface or floor.

The pneumatic foot assembly is mounted on the bottom of each leg of the table. When the control valve is in an operative position, the roller ball assemblies of the pneumatic foot assembly are lowered so that the table is raised, and the roller ball assemblies contact the floor such that the table may be rolled across the floor to a predetermined location. When in this predetermined location, the control valve is operated to vent the pressurized air in the pneumatic foot assembly and to retract the roller ball assemblies up into the foot assembly such that the table is lowered and the lower rim of the pneumatic foot assembly contacts the floor surface to stationarily position the table on the floor surface. The pneumatic foot assembly may be mounted on the leg or legs of a work station, a work bench, scaffolding, a table saw, a milling machine, and the like; that is, on any support which needs to be easily moved and thereafter, which can easily assume a stationary condition when the support is in use.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
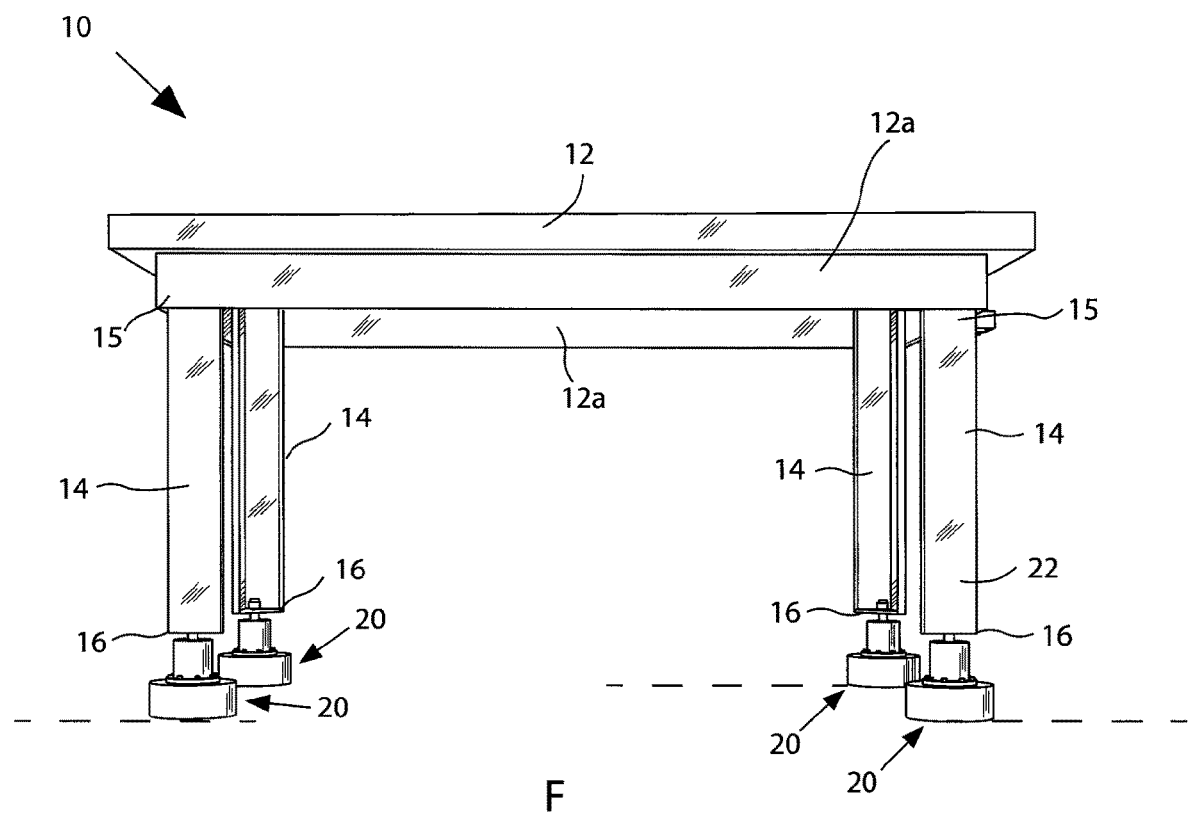
FIG. 1 is an elevational view of a work table embodying the present invention.
Figure 2:
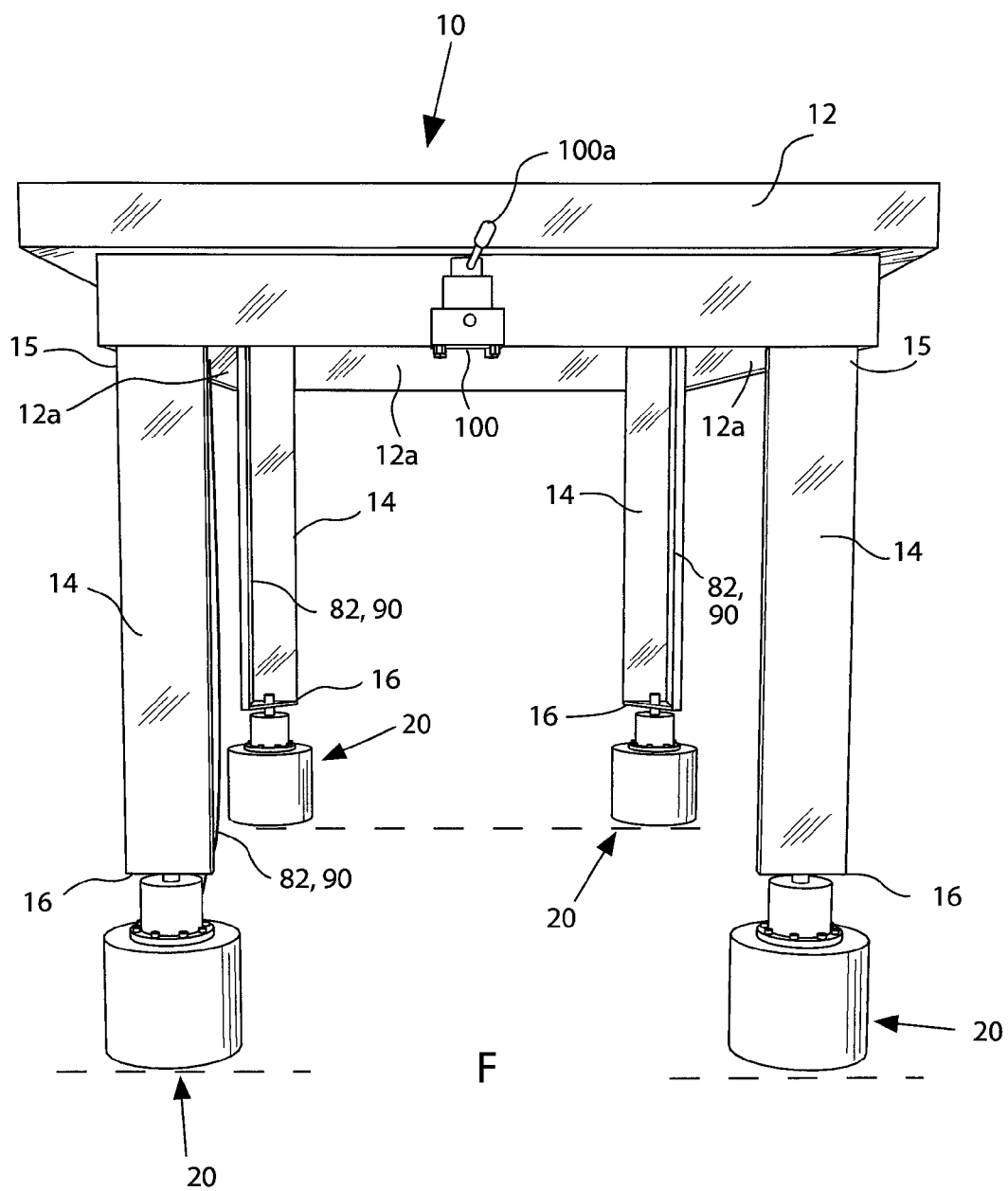
FIG. 2 is an elevational end view of the work table of FIG. 1 embodying the present invention.
Figure 3:
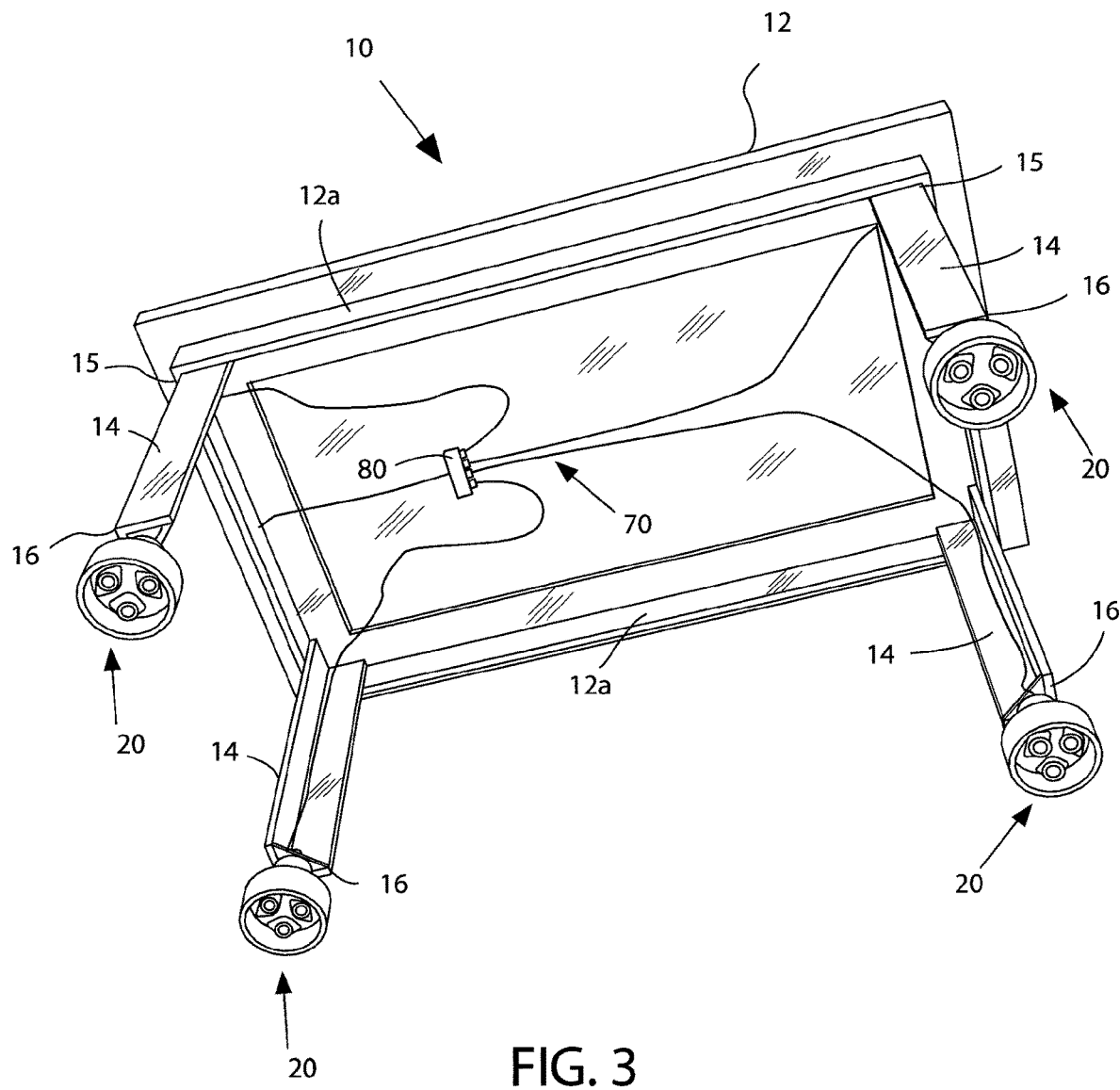
FIG. 3 is bottom, perspective view of the work table of FIG. 1 embodying the present invention and resting on a support surface.

Referring particularly to FIGS. 1, 2 and 3, the present invention is embodied in a vertically adjustable support 10 which comprises a top 12 and four legs 14 each of which supports the top 12 of the vertically adjustable support 10 above the floor surface F. Each leg 14 has a first end 15 connected to top 12, and a second end 16 spaced away from first end 15 and near floor surface F when support 10 is being supported by the floor surface F. As can be appreciated and as best shown in FIG. 2, each leg 14 is interconnected by four horizontal members 12a which extend parallel to top 12 and which form a rectangle, and which rectangle, in turn, supports top 12. Each leg 14 has a pneumatic foot assembly 20 mounted to its second end 16 and which, in general, abuts or rests on the floor surface F.

Each pneumatic foot assembly 20 on each leg 14 is identical; therefore, only one pneumatic foot assembly 20 will be described with particular reference to FIGS. 4, 5, 6, 7, 8 and 9, it being understood that the description thereof applies to all pneumatic foot assemblies. With particular reference to FIG. 6, pneumatic foot assembly 20 is comprised of a hollow housing 21 having a sidewall 22 and a chamber 56 defined by sidewall 22, and which chamber 56 is a fluid chamber, more about which will be discussed herein below.

Still referring particularly to FIG. 6, hollow housing 21 has a first end 23 which is a top end in FIG. 6 and is defined as such when pneumatic foot assembly 20 is mounted to the second end 16 of an associated leg 14. Hollow housing 21 also has a second end 24 which is spaced away from its first end 23. First end 23 of hollow housing 21 has a fluid port 25 defined therein. With regard to the upper portion of FIG. 6, pneumatic foot assembly 20 further comprises a connecting housing 26. Connecting housing 26 has a first end 27 and a second end 28. Connecting housing 26 is attached at its first end 27 to the first end 23 of hollow housing 21 of pneumatic foot assembly 20 via a plurality of bolts one of which is indicated by reference number 27a. Connecting housing 26 is located adjacent to fluid port 25. Connecting housing 26 also has a bore or chamber 30 extending there through.

Still referring to FIG. 6, the first end 27 of connecting housing 26 is open and is fluidically connected to chamber 56 of hollow housing 21 of pneumatic foot assembly 20 via fluid port 25. Referring to the upper portion of FIG. 6, the second end 28 of connecting housing 26 is closed and has a port 31 defined there through. With reference to the lower portion of FIG. 6, a piston unit 32 is movably mounted within chamber 56 of hollow housing 21. Piston unit 32 is comprised of a piston 40, a piston leg 54, and a piston plate 50. Piston plate 50 is movably located in chamber 56 for movement toward and away from the second end 24 of hollow housing 21 as indicated by the double-headed arrow shown in chamber 56. Piston leg 54 is connected at its first end to piston plate 50 and is connected at its second end to piston 40. Piston 40 is located in bore 30 of connecting housing 26 and is movable within bore or chamber 30 of connecting housing 26 toward and away from the first end 23 of hollow housing 21. Piston 40 has a diameter with a dimension less than the diameter of piston plate 50.

Figure 9:
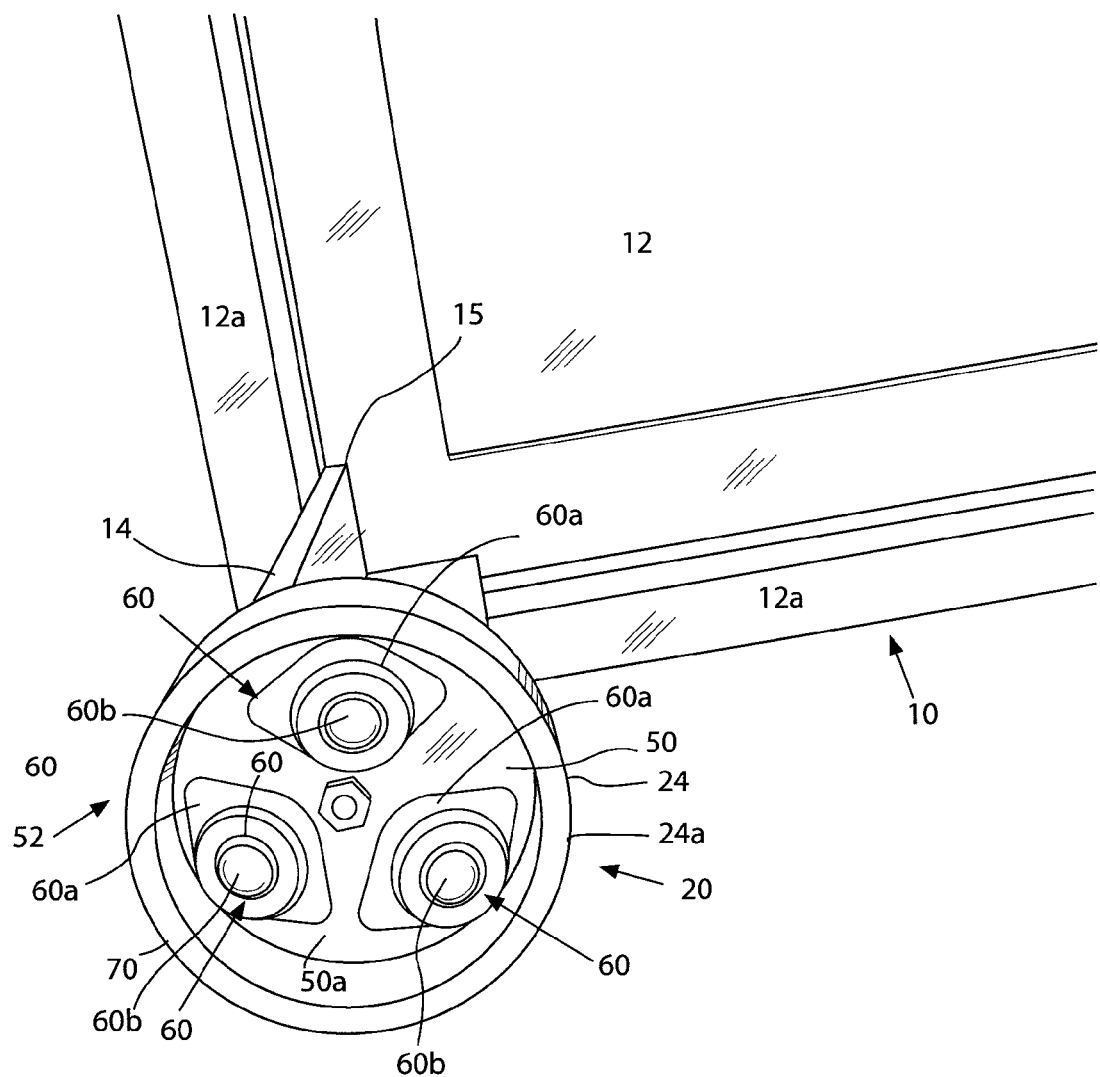
FIG. 9 is an enlarged bottom, perspective view of the pneumatic foot assembly of the invention secured to a leg of the work table.

Referring particularly to FIGS. 6 and 9, pneumatic foot assembly 20 further comprises a plurality of roller ball assemblies 60, which are mounted on the bottom surface 50a of piston plate 50 and outside of chamber 56 of pneumatic foot assembly 20. Roller ball assemblies 60 are structured and arranged to engage floor surface F. That is, roller ball assemblies 60 are mounted on piston plate 50 and outside of chamber 56 of hollowing housing 21 of pneumatic foot assembly 20 to engage the floor surface F such that support 10 is easily moved across floor surface F. That is, when piston plate 50 is positioned adjacent to the second end 24 of the hollow housing 21 of pneumatic foot assembly 20, roller ball assemblies 60 project out from the hollow housing 21 of pneumatic foot assembly 20 and the vertically adjustable support 10 becomes movable on the floor surface F or similar support surface. Conversely, when piston plate 50 is spaced away from floor surface F or similar support surface and positioned adjacent to first end 23 of hollow housing 21 of pneumatic foot assembly 30, then the second end 24 of hollow housing 21 is in contact with floor surface F or rests on floor surface F. In this instance, support 10 is stationarily positioned on the floor surface F. It is to be appreciated that the second end 24 of hollow housing 21 has a circular rim 24a (FIG. 9) and that it is this circular rim 24a that contacts and rests against the floor surface F.

Figure 4:
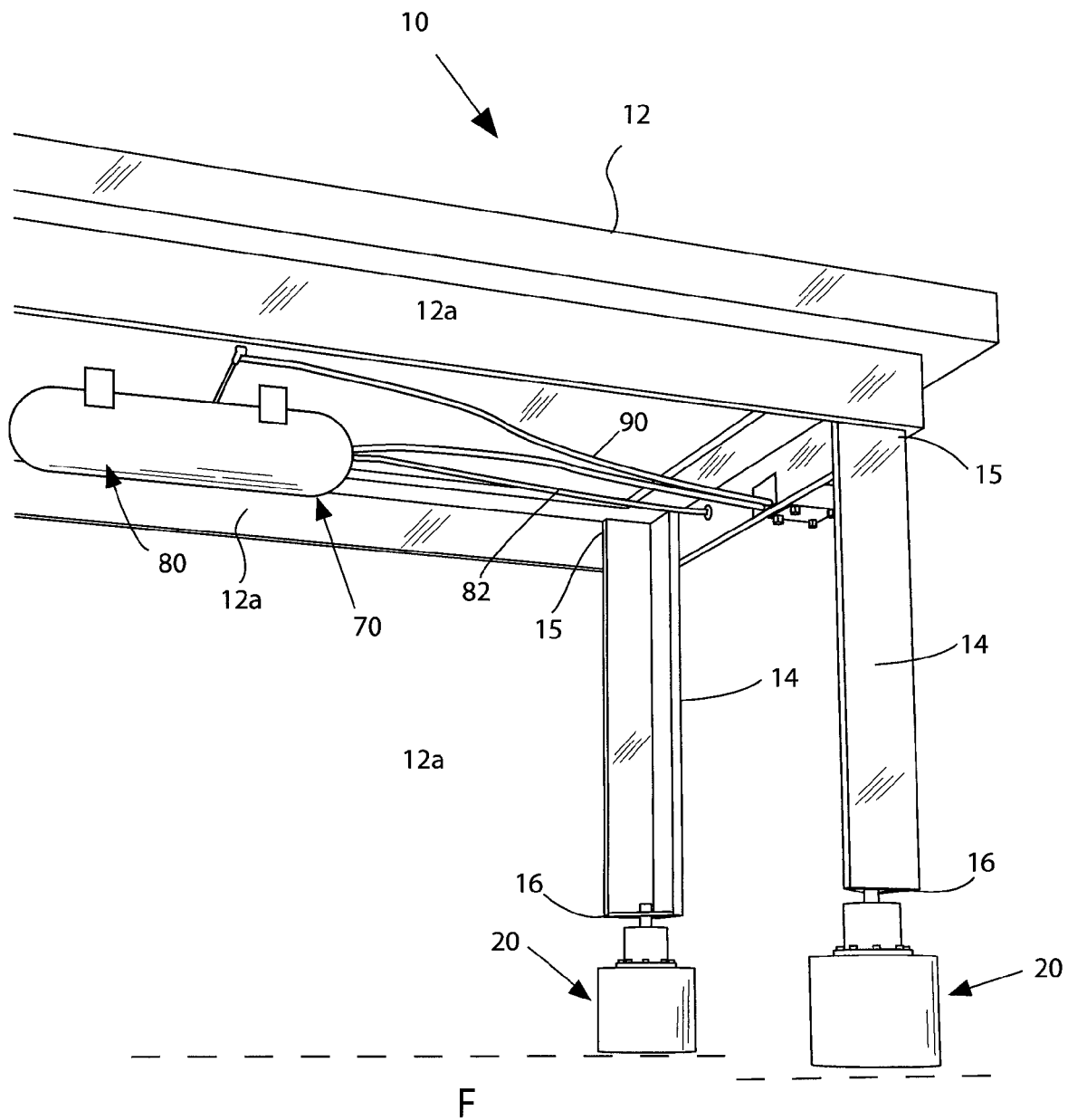
FIG. 4 is a bottom, perspective view of the work table of FIG. 1 embodying the present invention.
Figure 5:
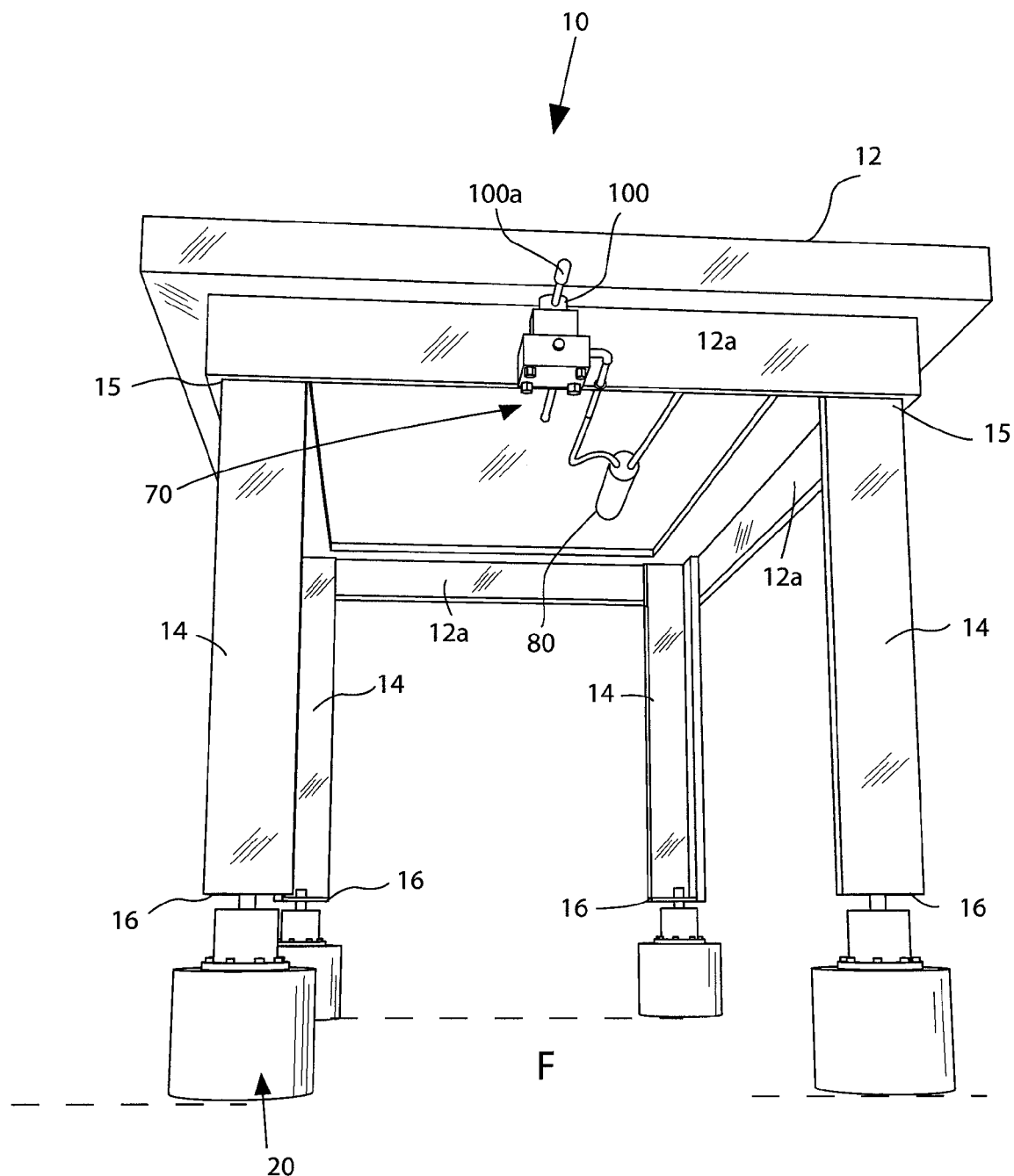
FIG. 5 is a bottom end view of the work table of FIG. 4 embodying the present invention.
Figure 6:
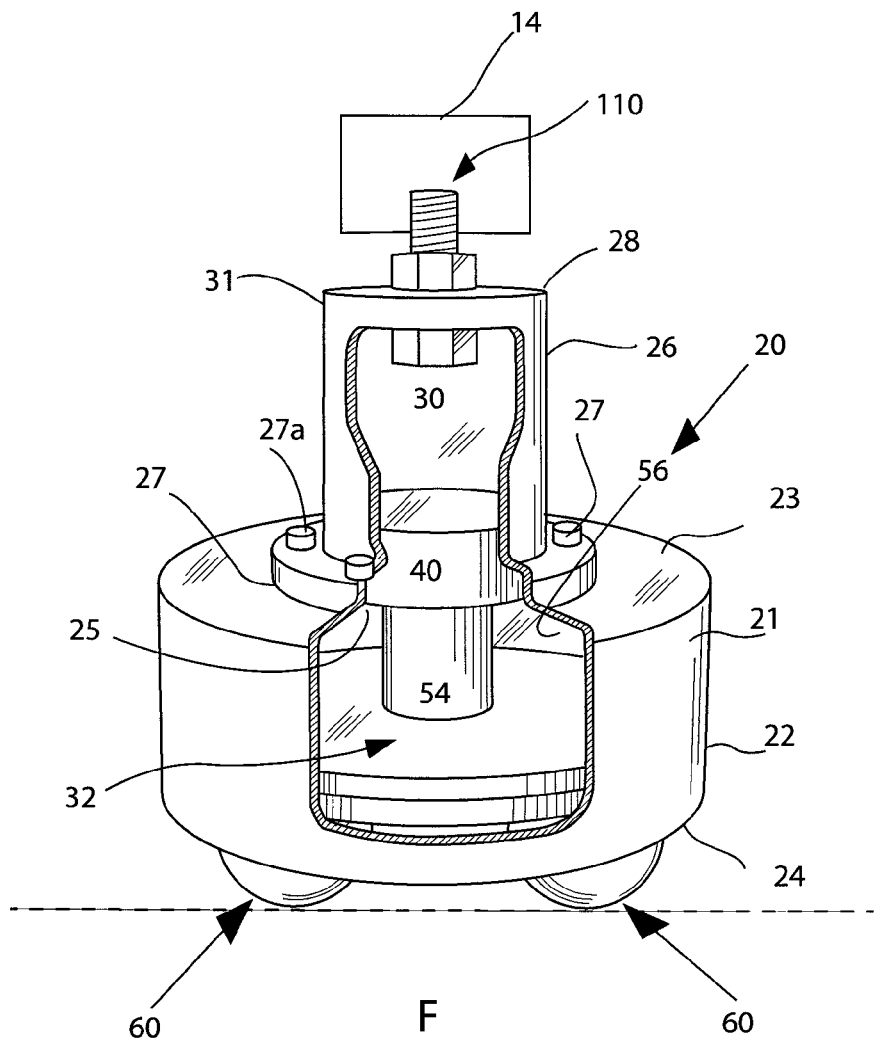
FIG. 6 is a schematic, perspective, partially cut-away view showing details of a pneumatic foot assembly of the invention.
Figure 7:
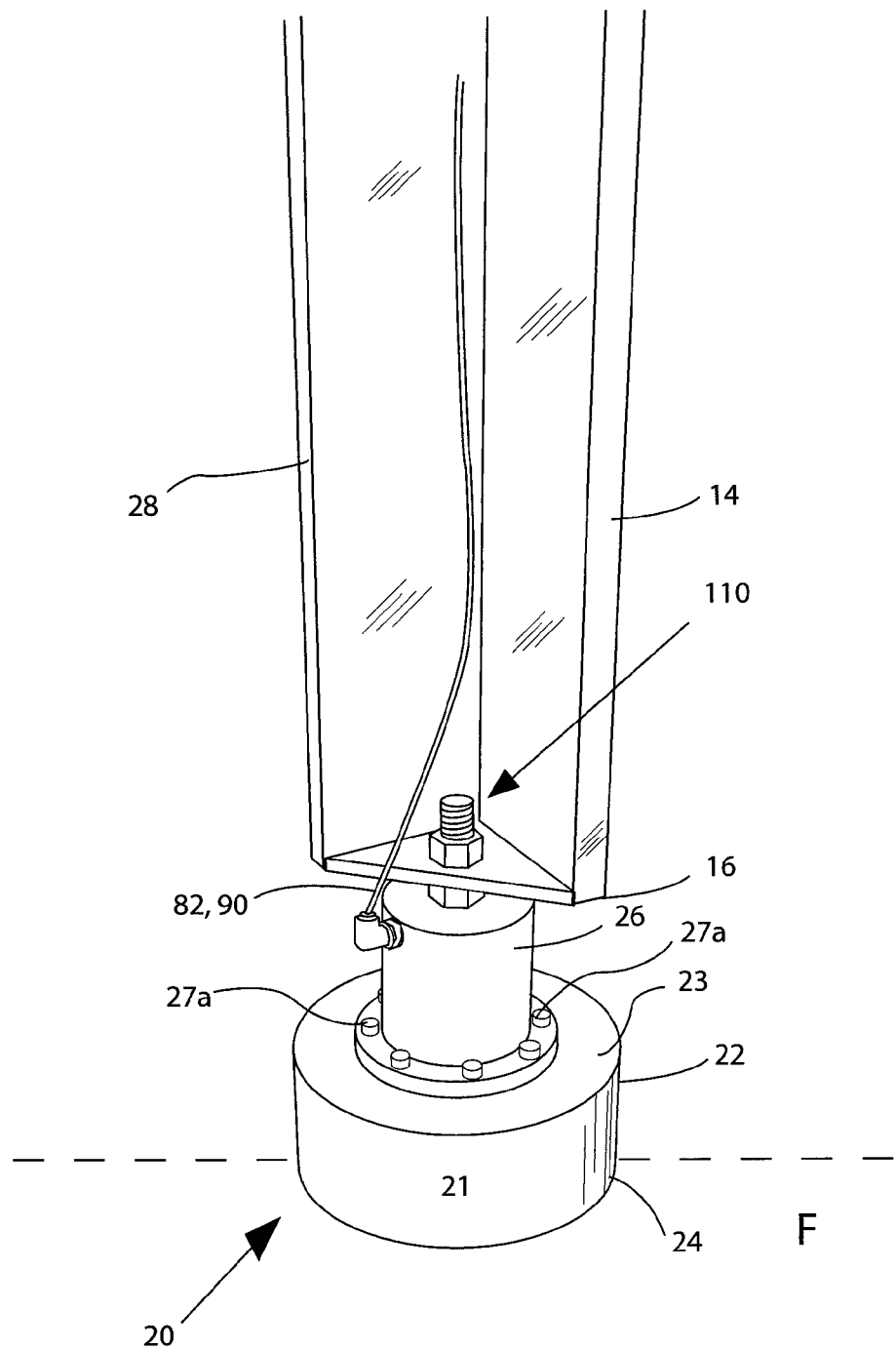
FIG. 7 is a perspective view showing a partial a leg and pneumatic foot assembly of the work table of FIG. 1.

Movement of piston unit 32, that is, piston 40 within bore 30 of connecting housing 26; piston leg 54 within bore 30 of connecting housing 26 and within chamber 56 of hollow housing 21; and piston plate 50 within chamber 56 of hollow housing 21 is better understood with reference to FIGS. 3, 4 and 5. As is shown in these figures, a fluid circuit 70 is provided in the invention. Fluid circuit 70 controls the operation of all four pneumatic foot assemblies 20. Fluid circuit 70 is fluidically connected to connecting housing 26 of each pneumatic foot assembly 20. Fluid circuit 70 comprises a fluid tank 80, a first fluid line 82 and a second fluid line 90. As best shown in FIG. 4, fluid tank 80 is mounted on the undersurface of vertically adjustable support 10. The first fluid line 82 is a fluid supply line and fluidically connects fluid tank 80 to bore 30 of connecting housing 26 via port 31 (FIG. 8) defined through the second end 28 of connecting housing 26 of each pneumatic foot assembly 20 to deliver fluid from fluid tank 80 and into bore 30 of connecting housing 26 so as to force piston 40, piston leg 54 and piston plate 50 towards the second end 24 of hollow housing 21 of each pneumatic foot assembly 20, and to force piston plate 50 towards the floor surface. In this instance, the roller ball assemblies 60 on piston plate 50 are caused to abut floor surface F and the vertically adjustable support 10 is caused to be raised a distance away from floor surface F. The roller ball assemblies 60 of each pneumatic foot assembly 20 in their abutting relationship with floor surface F allows vertically adjustable support 10 to be easily moved across the floor surface F.

A second fluid line 90 is a fluid return line and fluidically connects bore 30 of connecting housing 26 to the fluid tank 80 to carry the fluid in connecting housing 26 of each pneumatic foot assembly 20 back to fluid tank 80. This action causes piston 40, piston leg 54 and piston plate 50 of piston unit 32 to be moved upwardly within hollow housing 21 and connecting housing 26. In this instance, piston plate 50 along with its respective roller ball assemblies 60 are moved away from the support surface and upwardly into hollow housing 21. In this instance, support 10 is lowered and the circular rim 24 of first end 24 of hollow housing 21 of each pneumatic foot assembly 20 abuts or engages floor surface F, thereby positioning vertically adjustable support 10 in a stationary or fixed position on floor surface F. That is, vertically adjustable support 10 can no longer be rolled across the floor surface F. It is to be appreciated that first fluid line 82 and second fluid line 90 extend in alignment with each other along the length of each leg 14, even though this feature may not be shown in every figure.

Referring particularly to FIGS. 2 and 5, fluid circuit 70 further comprises a control valve 100. Control valve 100 is mounted on one of the horizontal members 12a of vertically adjustable support 10 and is fluidically interposed in series between fluid tank 80 and the connecting housing 26 of each pneumatic foot assembly 20 via the first and second fluid lines 82, 90 respectively. When the lever 100a of control valve 100 is flipped in an operative position, pressurized fluid from fluid tank 80 flows into chamber 30 of each pneumatic foot assembly 20 to force the piston unit 32 along with roller ball assemblies 60 downwardly such that roller ball assemblies 60 engage floor surface F in order to allow the vertically adjustable support 10 to be easily moved or rolled across the floor surface F.

When lever 100a of control valve 100 is flipped in an opposite direction or in an inoperative or fluid release position, the second fluid line or return fluid line 90 of each pneumatic foot assembly 20 is opened to the fluid tank 80 in order to allow the air to flow from the pneumatic foot assemblies 20 and back into fluid tank 80. In this instance, the weight of the vertically adjustable support 10 forces piston units 32 along with piston 40, piston leg 54, and piston plate 50 upwardly into the hollow housing 21 and into the connecting housing 26 until the circular rim 24a of second end 24 of hollow housing 21 directly contacts floor surface F. In this instance, vertically adjustable support 10 is stabilized; that is, support 10 is positioned in a fixed position on floor surface F.

Figure 8:
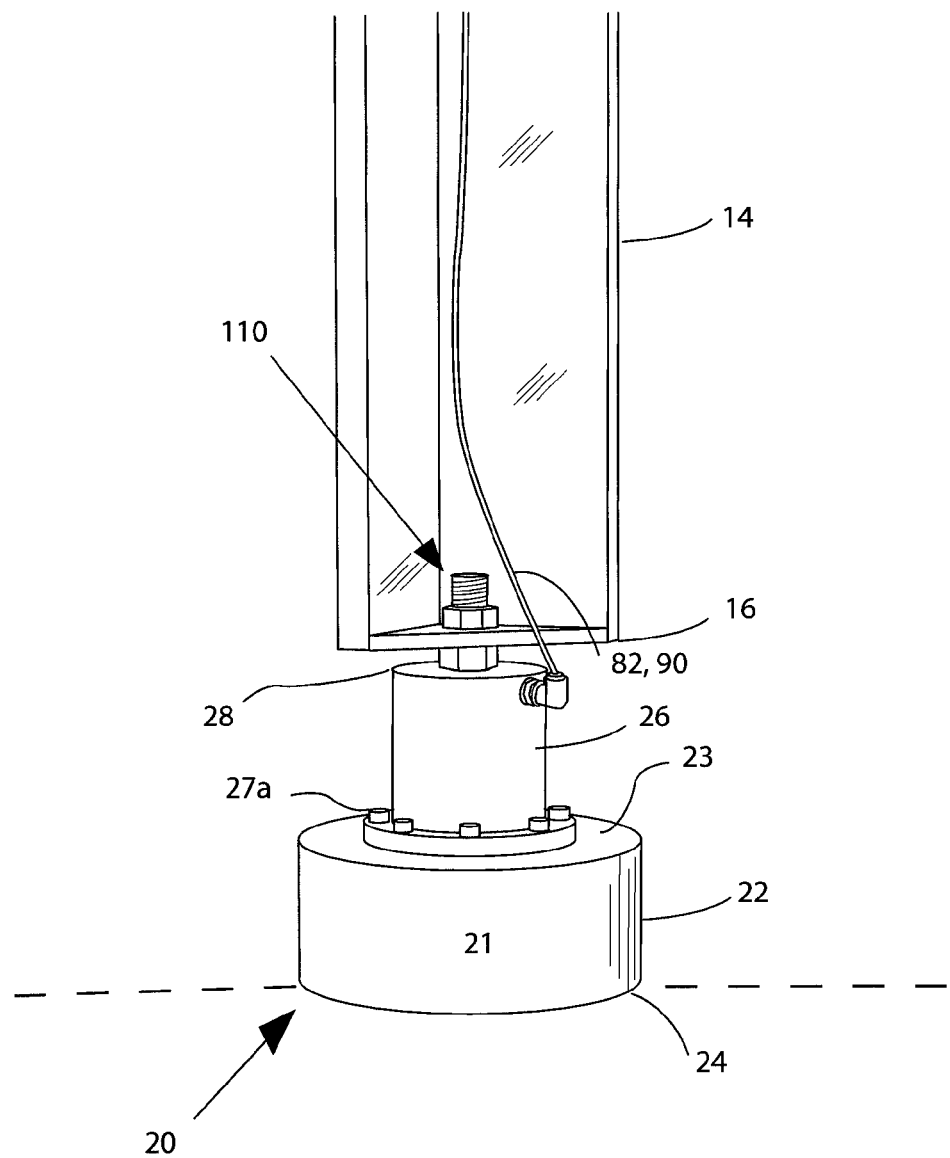
FIG. 8 is an enlarged, perspective view of the leg and pneumatic foot assembly of the work table of FIG. 7.

Referring particularly to FIGS. 6 and 8, vertically adjustable support 10 further includes a mounting assembly in the form of a nut and bolt assembly 110 which securely fastens pneumatic foot assembly 20 to leg 14 of support 10. As better shown in FIG. 8, it can be appreciated that nut and bolt assembly 110 allows the pneumatic foot assembly 20 to be moved toward and away from leg 14 for a desired height for support 10.

Foot assemblies 20 are disclosed herein above as being pneumatically operated, wherein compressed air is used as the fluid. In some embodiments of the invention, compressed gas may be used. Furthermore, the foot assemblies 20 may be hydraulically operated wherein compressed liquids, such as water or oil may be used in the fluid circuit 70. Also, as shown in FIG. 5, the control valve 100 in general is manually operated. It is to be appreciated that an electronic control system may be provided for operation of control valve 100 and fluid circuit 70 in a manner well-known to those skilled in the art.

With reference to FIG. 9, each roller ball assembly 60 is comprised of a housing 60a and a roller ball 60b. Roller ball 60b is secured in housing 60a for rotation thereof in housing 60a. Even though not shown, it is to be appreciated, that each roller ball assembly 60 is secured to the bottom surface 50a of piston plate 50 through suitable means, such as screws (not shown).

Roller ball assemblies 60 may be made of steel or other suitable materials; they are readily available in the market place; and they function in a manner well-known to those skilled in the art. Piston unit 32 may be made of stainless steel or other suitable materials; and hollow housing 21 and connecting housing 26 may be made of aluminum or other suitable materials. Also, it is to be further appreciated that vertically adjustable support 10 may be comprised of a table, a work station, a work bench, a work table, scaffolding, a table saw, or a milling machine.

Even though the invention has been described herein above with reference to a support which has four legs, it is to be appreciated that in an embodiment of the invention, a pneumatic foot assembly may be provided on a support that has only a single leg, or on a support that has more than or less than four legs.

While the present invention has been described in connection with the preferred embodiments of the various figures, it is to be understood that other similar embodiments may be used or modifications and additions may be made to the described embodiments for performing the same function of the present invention without deviating there from. Accordingly, it is intended by the appended claims to cover all such changes and modifications to come within the spirit and scope of the invention.

What is claimed is:

1. A pneumatic foot assembly for a vertically adjustable support and having a first chamber and a second chamber, the pneumatic foot assembly, comprising:
    a piston unit consisting essentially of a piston plate located in the first chamber of the pneumatic foot assembly and having an outer surface, a piston leg connected to the piston plate in the second chamber of the pneumatic foot assembly, and a piston connected to the piston leg and located in the second chamber of the pneumatic foot assembly;
    a plurality of roller ball assemblies mounted on the outer surface of the piston plate; and
    a fluid circuit comprising a fluid tank; at least two pneumatic fluid lines fluidically connecting the fluid tank to the second chamber of each pneumatic foot assembly; and a control valve in the pneumatic fluid lines to be fluidically interposed in series between the fluid tank and the second chamber of the pneumatic foot assembly;
    the piston plate of the piston unit of the pneumatic foot assembly operative by the control valve between a moving position to locate the roller ball assemblies into rolling contact with the support surface of the vertically adjustable support for movement of the vertically adjustable support across the support surface and into a stabilizing position to retract the roller ball assemblies into the first chamber of the pneumatic foot assembly for contact of the first chamber of the pneumatic foot assembly against the support surface to stationarily position the vertically adjustable support on the support surface.

2. The pneumatic foot assembly of claim 1, wherein the vertically adjustable support is selected from the group consisting of a work station, a work bench, a work table, scaffolding, a table saw, and a milling machine.

3. The pneumatic foot assembly of claim 1, further comprising a mounting assembly consisting of a nut and bolt assembly for securing the pneumatic foot assembly to the vertically adjustable support and for selectively moving the pneumatic foot assembly relative to the vertically adjustable support for a desire height of the vertically adjustable support.

4. The pneumatic foot assembly of claim 1, wherein the piston has a diameter with a dimension less than the diameter of the piston plate.

5. A vertically adjustable support, comprising:
    a top;
    a plurality of legs supporting the vertically adjustable support on a supporting surface;
    each leg having a pneumatic foot assembly interposed between the leg and the support surface;
    each pneumatic foot assembly including a piston unit having a first chamber and a second chamber, the piston unit consisting essentially of a piston plate in the first chamber having an outer surface, a piston leg in the second chamber connected to the piston plate, and a piston connected to the piston leg and located in the second chamber of the piston unit;
    a plurality of roller ball assemblies mounted on the outer surface of the piston plate; and
    a pneumatic fluid circuit comprising a fluid tank, pneumatic fluid lines fluidically connecting the fluid tank to the second chamber of each pneumatic foot assembly, and a control valve in the pneumatic fluid lines to be fluidically interposed in series between the fluid tank and the second chamber of each pneumatic foot assembly,
    the piston plate of each pneumatic foot assembly movable between a support moving position locating the roller ball assemblies mounted thereon into rolling contact with the support surface for the vertically adjustable support to move the vertically adjustable support along the support surface and a support stabilizing location with the roller ball assemblies spaced away from the support surface and with the first chamber of the pneumatic foot assembly contacting the support surface to position the vertically adjustable support in a stationary position on the support surface.

6. The vertically adjustable support of claim 5, further comprising a mounting assembly consisting of a nut and bolt assembly for securing each pneumatic foot assembly to its respective leg and for selectively moving the pneumatic foot assembly toward and away from its respective leg for a desire height of the vertically adjustable support.

7. The vertically adjustable support of claim 5, wherein the piston has a diameter with a dimension less than the diameter of the piston plate.

8. A vertically adjustable support, comprising:
a top;
a plurality of legs supporting the top, each leg having a first end connected to the top and a second end spaced away from the first end of the leg;
a plurality of pneumatic foot assemblies, each pneumatic foot assembly mounted on the second end of each leg, and each pneumatic foot assembly, comprising:
a hollow housing having a sidewall and a chamber defined by the sidewall; a first end and a second end spaced away from the first end of the housing; a port defined in the hollow housing;
a connecting housing with a first end and a second end and being attached at the first end to the first end of the hollow housing and adjacent to the port defined in the hollow housing;
the connecting housing having a bore defined there through, the first end of the connecting housing being open and fluidically connected to the chamber of the hollow housing of the pneumatic foot assembly via the port defined in the hollow housing and the second end of the connecting housing being closed and having a port defined there through;
a piston unit mounted in each pneumatic foot assembly, the piston unit, consisting essentially of:
a piston plate having an outer surface and movably located in the chamber of the hollow housing of the pneumatic foot assembly for movement toward and away from the second end of the hollow housing of the pneumatic foot assembly;
a piston leg having a first end and a second end, and being movably located in the chamber of the hollow housing of the pneumatic foot assembly and connected at its first end to the piston plate of the piston unit;
a piston located in the bore of the connecting housing and movable within the bore of the connecting housing toward and away from the first end of the hollow housing of the pneumatic foot assembly, the piston being connected to the second end of the piston leg; and
a plurality of roller ball assemblies mounted on the outer surface of the piston plate and extending outwardly from the chamber of the hollow housing of the pneumatic foot assembly to movably engage the support surface for the vertically adjustable support when the piston plate is located adjacent to the second end of the hollow housing of the pneumatic foot assembly for movement of the vertically adjustable support on the support surface and the plurality of roller ball assemblies being spaced away from the support surface when the piston plate is located adjacent to the first end of the hollow housing of the pneumatic foot assembly so the second end of the hollow housing of the pneumatic foot assembly is in contact with the support surface for the vertically adjustable support to position the vertically adjustable support in a stationary position on the support surface;
a pneumatic fluid circuit fluidically connected to the connecting housing of each pneumatic foot assembly, the pneumatic fluid circuit comprising a fluid tank, a first pneumatic fluid line, and a second pneumatic fluid line;
the first pneumatic fluid line fluidically connecting the fluid tank to the connecting housing bore via the port defined through the second end of the connecting housing of each pneumatic foot assembly to carry pneumatic fluid from the fluid tank into the bore defined through the connecting housing of each pneumatic foot assembly to force the piston leg of each pneumatic foot assembly toward the second end of the hollow housing of each pneumatic foot assembly to force the piston plate toward the support surface and contact the roller ball assemblies on the piston plate with the support surface to thereby make the vertically adjustable support movable across the support surface for the vertically adjustable support;
the second pneumatic fluid line fluidically connecting the connecting housing bore to the fluid tank via the bore defined through the connecting housing of each pneumatic foot assembly to carry pneumatic fluid from the connecting housing of each pneumatic foot assembly back to the fluid tank to allow the weight of the vertically adjustable support to force the piston plate away from the support surface and to move the roller ball assemblies on the piston plate away from the support surface and to allow the hollow housing of each pneumatic foot assembly to contact the support surface to thereby make the vertically adjustable support stationary on the support surface; and
a control valve fluidically interposed in series between the fluid tank of the fluid circuit and the connecting housing of each pneumatic foot assembly.

9. The vertically adjustable support of claim 8, further comprising: a mounting assembly for securing the pneumatic foot assembly to a leg of the vertically adjustable support, the mounting assembly being movably mounted on the leg to move the pneumatic foot assembly associated with the leg toward and away from the leg.

10. The vertically adjustable support of claim 8, wherein the control valve is mounted on the top of the vertically adjustable support.

11. The vertically adjustable support of claim 8, further comprising a mounting assembly consisting of a nut and bolt assembly for securing each pneumatic foot assembly to its respective leg and for selectively moving the pneumatic foot assembly toward and away from its respective leg for a desire height of the vertically adjustable support.

12. The vertically adjustable support of claim 8, wherein the piston has a diameter with a dimension less than the diameter of the piston plate.

* * * * *